US008504671B1

(12) United States Patent
Schepis et al.

(10) Patent No.: US 8,504,671 B1
(45) Date of Patent: Aug. 6, 2013

(54) SYSTEMS AND METHODS FOR RATING A CURRENT INSTANCE OF DATA BASED ON PRECEDING AND SUCCEEDING INSTANCES OF DATA

(75) Inventors: Adam Schepis, Milford, MA (US); Keith Newstadt, Newton, MA (US)

(73) Assignee: Symantec Corporation, Mountain View, CA (US)

( * ) Notice: Subject to any disclaimer, the term of this patent is extended or adjusted under 35 U.S.C. 154(b) by 274 days.

(21) Appl. No.: 12/874,481

(22) Filed: Sep. 2, 2010

(51) Int. Cl.
*G06F 15/173* (2006.01)

(52) U.S. Cl.
USPC .......................................... 709/223; 709/224

(58) Field of Classification Search
USPC .................................................. 709/224, 223
See application file for complete search history.

(56) References Cited

U.S. PATENT DOCUMENTS

| 6,405,175 | B1 * | 6/2002 | Ng ............................. 705/14.26 |
| 7,418,431 | B1 * | 8/2008 | Nies et al. ........................ 706/21 |
| 7,530,106 | B1 * | 5/2009 | Zaitsev et al. ................... 726/24 |
| 8,170,978 | B1 * | 5/2012 | Newstadt et al. ............... 706/54 |
| 8,209,329 | B2 * | 6/2012 | Asai ............................... 707/725 |
| 8,281,361 | B1 * | 10/2012 | Schepis et al. ..................... 726/1 |
| 2003/0126090 | A1 * | 7/2003 | Fukuoka et al. ................. 705/54 |
| 2007/0061869 | A1 * | 3/2007 | DeHaas ............................ 726/2 |
| 2008/0052315 | A1 * | 2/2008 | Kasahara et al. .......... 707/104.1 |
| 2009/0193007 | A1 * | 7/2009 | Mastalli et al. .................... 707/5 |
| 2010/0094791 | A1 * | 4/2010 | Miltonberger .................. 706/46 |
| 2010/0125911 | A1 * | 5/2010 | Bhaskaran ....................... 726/23 |
| 2010/0169474 | A1 * | 7/2010 | Beckett et al. ................. 709/224 |
| 2010/0174813 | A1 * | 7/2010 | Hildreth et al. ................ 709/224 |
| 2010/0273443 | A1 * | 10/2010 | Forutanpour et al. ....... 455/404.1 |
| 2010/0306850 | A1 * | 12/2010 | Barile et al. ..................... 726/25 |
| 2011/0047117 | A1 * | 2/2011 | Sinha .............................. 706/47 |
| 2011/0087495 | A1 * | 4/2011 | O'Neill et al. ................. 705/1.1 |
| 2011/0131123 | A1 * | 6/2011 | Griffin et al. ................... 705/35 |
| 2011/0267419 | A1 * | 11/2011 | Quinn et al. ............... 348/14.08 |
| 2011/0288836 | A1 * | 11/2011 | Lacaille et al. .................... 703/2 |

* cited by examiner

*Primary Examiner* — Bharat N Barot
*Assistant Examiner* — Waseem Ashraf
(74) *Attorney, Agent, or Firm* — Holland & Hart LLP (57) ABSTRACT

A computer-implemented method for rating a current instance of data is described. An activity occurring on a computing system is monitored. The activity includes the current instance of data. A rating is assigned to the current instance of data. A determination is made as to whether the activity includes at least one additional instance of data. When the activity includes at least one additional instance of data, the rating assigned to the current instance of data is updated. The updated rating is based on the content of the at least one additional instance of data.

13 Claims, 10 Drawing Sheets

SYSTEMS AND METHODS FOR RATING A CURRENT INSTANCE OF DATA BASED ON PRECEDING AND SUCCEEDING INSTANCES OF DATA

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

Many businesses use one or more computer networks to communicate and share data between the various computers connected to the networks. The productivity and efficiency of employees often require human and computer interaction. Users of computer technologies continue to demand that the efficiency of these technologies increase. Improving the efficiency of computer technologies is important to anyone who uses and relies on computers.

The World Wide Web network (e.g., the Internet) has dramatically increased the amount of information that is readily available to users of computers. Businesses and individuals are able to access information for virtually any topic via this network. This accessibility, however, may include some drawbacks. For example, content may be accessed via the Internet that is inappropriate for some users. In addition, these users may transmit/receive inappropriate data to/from other users. Supervisors (e.g., parents, teachers, guardians, etc.) of these users may desire to become aware of the activities engaged in by these users on the Internet, and whether certain activities warrant further action by the supervisor (e.g., conversation with the user, restrict computer usage privileges, etc.). As a result, benefits may be realized by providing system and methods for rating a current instance of data based on preceding and succeeding instances of data.

SUMMARY

According to at least one embodiment, a computer-implemented method for rating a current instance of data is described. An activity occurring on a computing system is monitored. The activity includes the current instance of data. A rating is assigned to the current instance of data. A determination is made as to whether the activity includes at least one additional instance of data. If the activity includes at least one additional instance of data, the rating assigned to the current instance of data is updated. The updated rating is based on the content of the at least one additional instance of data.

In one embodiment, a determination is made as to whether access to the current instance of data is to be blocked. The determination to block access to the current instance of data may be based on the content of the current instance of data. In one configuration, the at least one additional instance of data precedes the current instance of data. In one example, the at least one additional instance of data succeeds the current instance of data.

A rating may be assigned to the activity. The rating assigned to the activity may be based on the rating assigned to the current instance of data and a rating assigned to the at least one additional instance of data. At least one instance of data may be identified based on the rating assigned to the at least one instance of data. The at least instance of data may be identified by highlighting the content of the at least one instance of data. The contents of the identified at least one instance of data may be displayed on a display of the computing system. In one embodiment, the rating assigned to the current instance of data may be reduced if at least one additional instance of data of the activity is not accessed within a predetermined time period.

A computing device configured to rate a current instance of data is also described. The device includes a processor and memory in electronic communication with the processor. The computing device may also include a monitoring module configured to monitor an activity occurring on the computing device. The activity may include the current instance of data. The monitoring module may be further configured to assign a rating to the current instance of data, and determine if the activity includes at least one additional instance of data. If the activity includes at least one additional instance of data, the monitoring module may be configured to update the rating assigned to the current instance of data. The updated rating may be based on the content of the at least one additional instance of data.

A computer-program product for rating a current instance of data is also described. The computer-program product may include a computer-readable medium having instructions thereon. The instructions may include code programmed to monitor an activity occurring on the computing device. The activity may include the current instance of data. The instructions may also include code programmed to assign a rating to the current instance of data, and code programmed to determine if the activity includes at least one additional instance of data. If the activity includes at least one additional instance of data, the instructions may further include code programmed to update the rating assigned to the current instance of data. The updated rating may be based on the content of the at least one additional instance of data.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Content filtering and monitoring software typically take the approach of blocking a user's access to data when that user is attempting to access inappropriate data. Data may refer to activities, content, text, images, and the like that may be accessed online via the Internet. Present filtering and monitoring approaches may be effective for certain users (e.g., young children), but may be much less effective for other users (e.g., older children) who may be mature enough for some data that is completely blocked from being accessed. These users may become frustrated as access to this data is blocked.

Additionally, supervisors (e.g., parents, guardians, teachers, etc.) of these users may desire to know the type of data being accessed online by these users. This knowledge may be crucial when a supervisor is conversing with a user regarding the user's online activity. The supervisor may be able to address certain topics with additional emphasis to the user if the supervisor is aware of the type of data being accessed online by the user.

Presently, the solution to provide this information to supervisors is to log every bit of data accessed online by these users. With the increasing number of online services, however, the practice of logging everything may cause additional problems for a supervisor. For example, a log that includes every bit of data accessed online by a user may not alert a supervisor as to what are the most important data to examine. As a result, the present solution of logging every non-blocked activity and piece of content accessed by a user may not provide a supervisor with a good understanding of how the user is actually using the Internet to access data.

Typically, individuals interact with the Internet in sessions, rather than single events. For example, a user may read the news and then shop for books. A user may instant message with a friend about one topic and then digress to another topic. A single event may or may not hint at what the user is doing online or whether the data the user is accessing is appropriate.

Mechanisms exist for flagging important activities and content. These current mechanisms create some type of alert when a particular event occurs (e.g., activity or certain content is accessed). This current practice, however, is still insufficient. For example, a supervisor is still left unaware of the individual sections of an activity that would assist the supervisor in communicating with the user regarding his/her Internet usage.

A system that attempts to identify an activity of interest within an event must consider the overall context of the event, the events that come before and after the present event, the activities that occur before and after the present activity, etc. Evaluating the overall context of an event, the preceding and succeeding events, and the preceding and succeeding activities may allow a supervisor to identify meaningful portions of the event. For instance, when a use engages in an event of instant messaging, a current message of the conversation may be rated based on the content of the message itself, as well as the content of the messages that occur before and after the current message. The ratings of each message in the conversation may provide an overall rating for the instant messaging event. In addition, messages may be grouped together and given a rating based on the content of the messages within the group as well the content of messages that occur before and after the group of messages.

In one embodiment, a supervisor my end up with a data set for the entire instant message conversation that would allow the supervisor to look for the areas of the conversation with the highest average importance or rating. These sections may then be displayed differently to the supervisor (different color, hyper-linked to important content, etc.) than the other sections of the conversation. By considering the context of an event (and the single instances of data that make up the event), the present systems and methods may flag potentially interesting data of an event while reducing the risk of causing false positives.

The present systems and methods address the current problems provided above by rating single instances of data on a scale of importance. The present systems and methods also determine a rating for a particular plurality of instances of data. These ratings may be determined based on the content of the instances of data themselves as well as the data that is accessed before and after the rated instance of data. The present systems and methods may also account for a decay in importance of data over time if no new important activity occurs that is related to the rated data.

The present systems and methods may rate a particular piece of data based on various characteristics of the particular piece of data as well as pieces of data that occur before and after the particular piece of data. For example, the rating may be based on whether the data contain links to the Internet, the ratings of the links, whether the data contain language that might imply an escalation in importance, whether the data discuss phones, addresses, meetings, whether the data include explicit language, emoticons, bullying language, words that may be slang for drugs, or other inappropriate material, whether the data is accessed at an unusual time of day, whether the data contains imbedded photos or videos, and the like.

Figure 1:
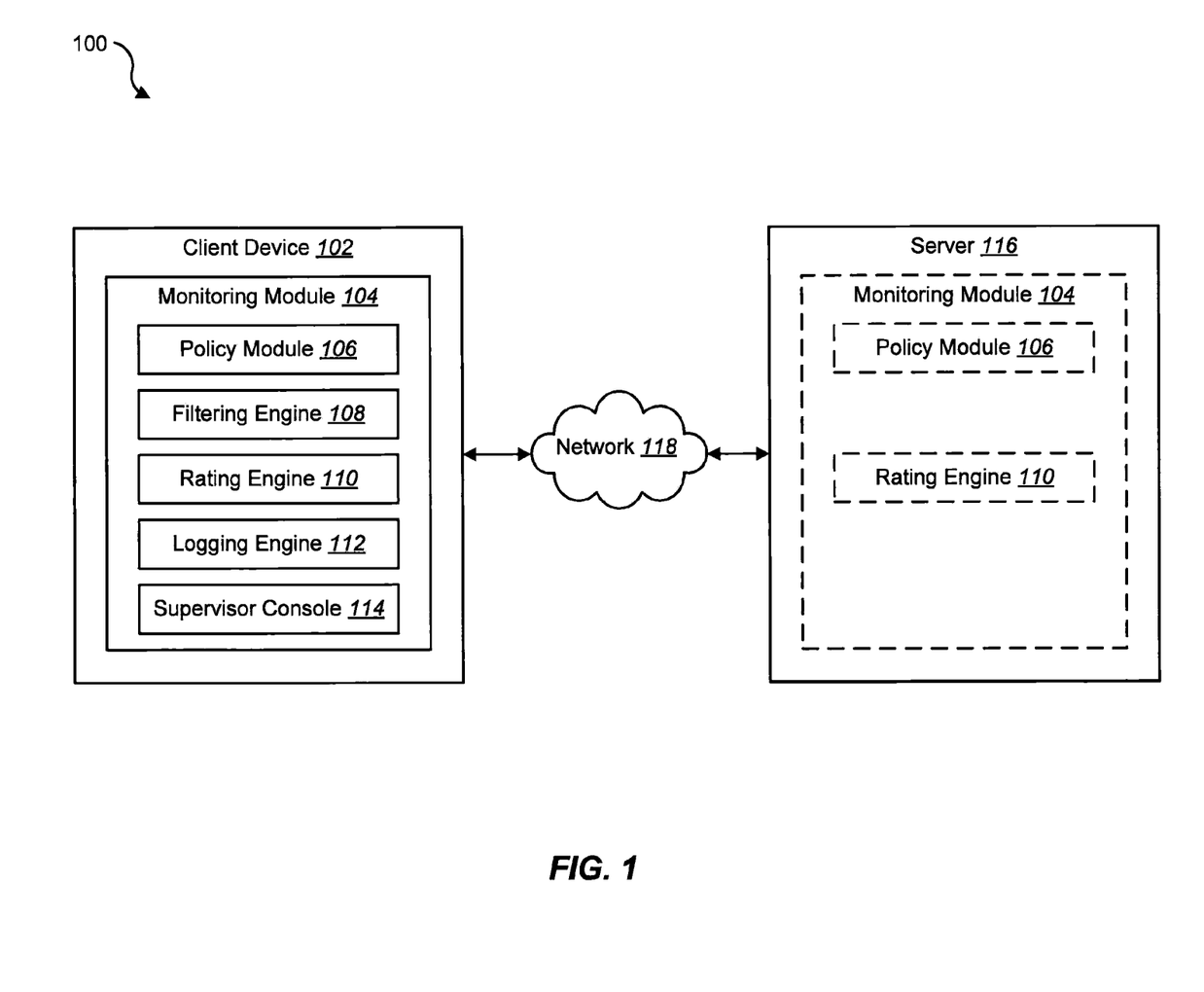
FIG. 1 is a block diagram illustrating one embodiment of a client device communicating with a server across a network connection.

FIG. 1 is a block diagram illustrating one embodiment of a client device 102 communicating with a server 116 across a network connection 118. In one configuration, client device 102 may be a personal computer (PC), a laptop, a personal digital assistant (PDA), a smart phone, a mobile device, or any other type of computing device.

In one example, client device 102 may include a monitoring module 104. The module 104 may include a policy module 106, a filtering engine 108, a rating engine 110, a logging engine 112, and a supervisor console 114.

In one embodiment, the policy module 106 may either reside on the client device 102 or on the server 116. The policy module 106 may maintain one or more policies for various individuals. The various policies may include rules relating to the access of data provided by the client device 102 by each user. For example, a first policy maintained by the module 106 may be associated with a first user. The first policy may indicate the type of data that is to be blocked from being accessed by the first user.

The filtering engine 108 may analyze data accessed on the client device 102. The filtering engine 108 may access the various policies maintained by the policy module 106 to determine whether a particular piece of data should be blocked from being accessed on the client device 102 or allowed to be accessed on the client device 102. The rating engine 110 may provide a rating for each piece of data that is not blocked by the filtering engine 108. In addition, the rating engine 110 may provide a rating for a group of individual pieces data. Further, the rating engine may provide a rating for an event that includes the rated pieces of data.

The logging engine 112 may maintain a log of the various events, activities, data, etc. accessed on the client device 102. In other words, the logging engine 112 may maintain a record of the data that is not blocked by the filtering engine 108. The supervisor console 114 may be an interface that allows a user (such as a supervisor, parent, guardian, teacher, etc.) to view a report that includes a data set that provides details regarding the rating of each piece of data accessed on the client device 102.

As previously explained, the server 116 may include portions of the monitoring module 104. For example, the policy module 106 and the rating engine 110 may reside on the server 116 in addition to or instead of residing on the client device 102.

Figure 2:
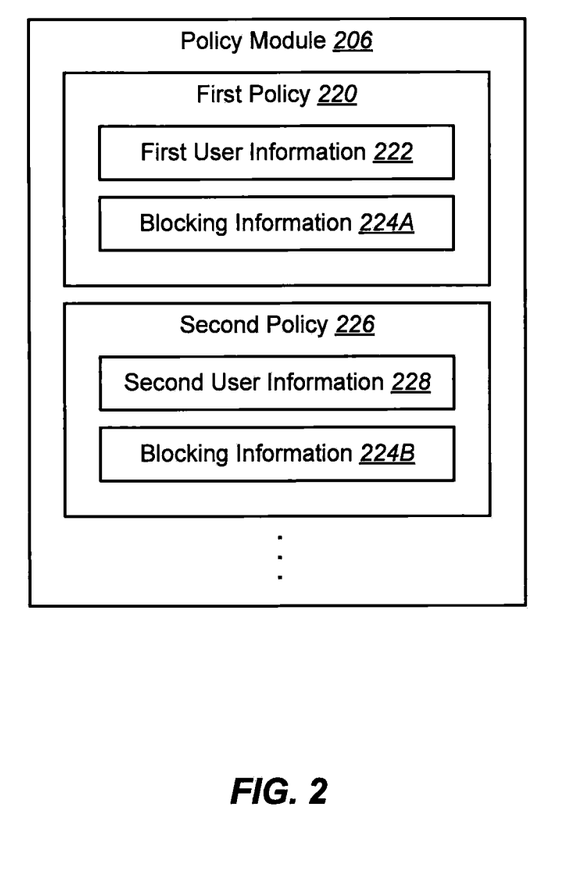
FIG. 2 is a block diagram illustrating one embodiment of a policy module.

FIG. 2 is a block diagram illustrating one embodiment of a policy module 206. As previously explained, the policy module 206 may maintain one or more policies associated with one or more users. For example, the policy module 206 may maintain a first policy 220 for a first user, and a second policy 226 for a second user. The first policy 220 may include first user information 222. This information 222 may include the first user's age, gender, etc. The first policy 220 may also include blocking information 224A. The blocking information 224A may indicate the type of data that should be blocked from being accessed by the first user. Similarly, the policy module 206 may include a second policy 226 that includes second user information 228 associated with a second user. Blocking information 224B may indicate the data that should be blocked from being accessed by the second user.

The blocking information 224A for the first user may be different than the blocking information 224B for the second user depending the first user information 222 and the second user information 228. For example, the blocking information 224A for the first user may indicate that all data (e.g., activities, images, videos, etc.) available online that relates to a particular topic should be blocked from being accessed by the first user. The blocking information 224B, however, for the second user may not indicate that data relating to the particular topic be blocked from being accessed by the second user. The difference in the blocking information 224A for the first user and the blocking information 224B for the second user may be based on the age difference between the two users. While only two policies 220 and 226 are illustrated in FIG. 2, it is to be understood that the policy module 206 may maintain more or less than two policies.

Figure 3:
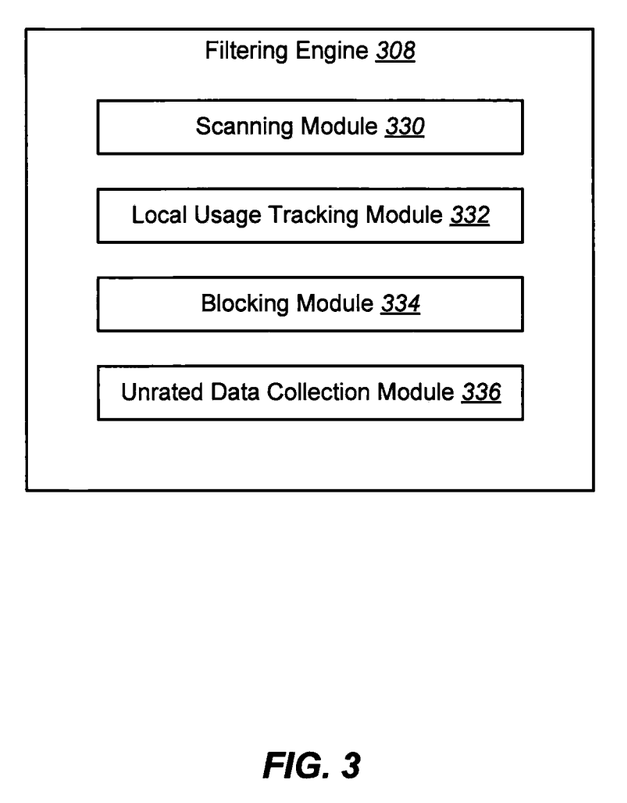
FIG. 3 is a block diagram illustrating one embodiment of a filtering engine.

FIG. 3 is a block diagram illustrating one embodiment of a filtering engine 308. The filtering engine 308 may include a scanning module 330, a local usage tracking module 332, a blocking module 334 and an unrated data collection module 336. In one embodiment, the filtering engine 308 may reside on a client device 102.

The scanning module 330 may scan and identify data within network traffic that may be received at the client device 102 via the network 118. The local usage tracking module 332 may track the usage of programs, applications, services, etc. that may be locally installed or available on the client device 102. In one embodiment, the filtering engine 308 may access a policy for a particular user. The policy may be maintained by the policy module 106. Based on the policy for the particular user, the blocking module 334 may block access to data received over the network traffic. The blocking module 334 may also block access to data stored locally on the client device 102 depending on the policy for the particular user attempting to access the data. The unrated data collection module 336 may gather or collect data associated with the various events (e.g., network traffic, local computer usage, etc.) that are not blocked by the blocking module 334. In one configuration, the unblocked data collected by the unrated data collection module 336 may not yet be assigned a rating of importance.

Figure 4:
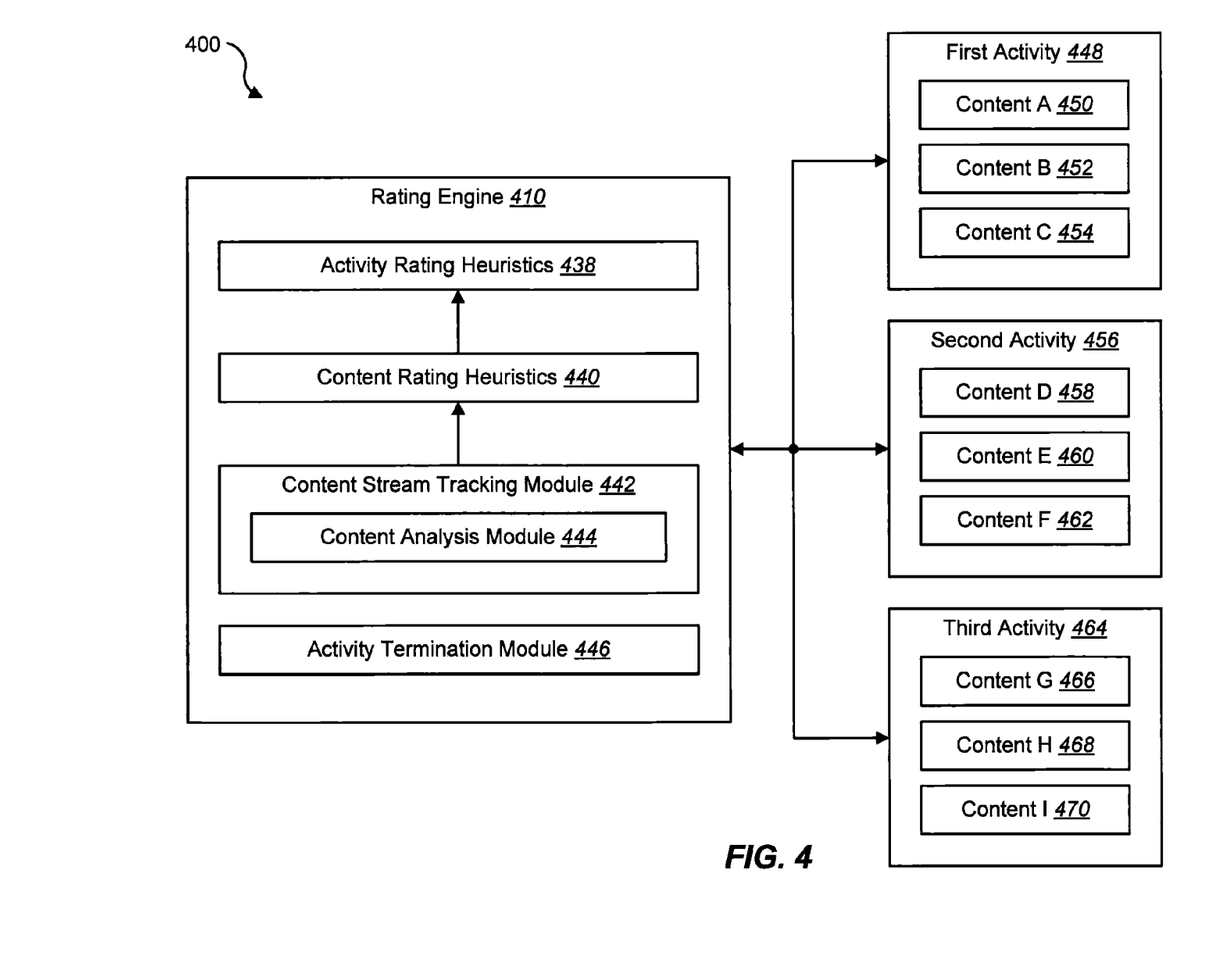
FIG. 4 is a block diagram illustrating one embodiment of a rating engine that rates activities and the various pieces of data or content associated with each activity.

FIG. 4 is a block diagram illustrating one embodiment of a rating engine 410 that rates activities (e.g., first activity 448, second activity 456, third activity 464) and the various pieces of data or content associated with each activity. The various pieces of data or content associated with each activity may be collected by the unrated data collection module 336 as described above. In one configuration, the rating engine 410 may include activity rating heuristics 438, content rating heuristics 440, and a content stream tracking module 442. In one example, the rating engine 410 may also include an activity termination module 446. In one embodiment, the rating engine 410 may reside on the client device 102 or the server 116.

As an example, a first user may engage in a first activity 448. As an example, the first activity 448 may be an instant messaging session in which the first user sends/receives data to/from a second user. As a result, the first activity 448 may include various pieces of content (e.g., content A 450, content B 452, content C 454). The various pieces of content 450, 452, 454 may be text messages, images, files, videos, or any other type of data sent/received by the first user to/from the second user. The content rating heuristics 440 may be used by the rating engine 410 to assign a rating of importance to an individual piece of content associated with the first activity 448 (e.g., content B 452).

The content stream tracking module 442 may track each piece of content associated with the first activity 448. A content analysis module 444 may analyze each piece of content tracked by the tracking module 442. In one embodiment, the content rating heuristics 440 may be used by the rating engine to update the rating previously assigned to a piece of content. For example, content B 452 may be assigned a rating based on the content rating heuristics 440. The content stream tracking module 442 may track the pieces of content that occur before and after the occurrence of content B 452 (e.g., content A 450 and content C 454). Content A 450 and content C 454 may also be assigned a rating of importance according to the content rating heuristics 440. The content analysis module 444 may analyze content A 450 and content C 454 and based on the analysis, the rating engine 410 may update the rating previously assigned to content B 452. For example, the analysis module 444 may analyze the ratings assigned to content A 450 and content C 454. In addition, the analysis module 444 may analyze the content of content A 450 and content C 454 to determine whether the rating assigned to content B 452 should be updated. As a result, the rating of a current piece of content may be continuously updated based on the pieces of content and precede and follow the current piece of content. In one example, the content stream tracking module 442 may determine that no additional content for a particular activity has been received. The rating for one or more pieces of content for this activity may decay if a predetermined time elapses with no additional content being added to the activity.

In one embodiment, the rating engine 410 may use the activity rating heuristics 438 to assign an overall rating to the first activity 448. The rating assigned to the first activity 448 may be based on the ratings assigned to each piece of content 450, 452, 454 included in the first activity 448. The rating engine 410 may continue to assign ratings to each additional activity and pieces of content illustrated in FIG. 4. As a result, a supervisor may easily identify the activity or activities with the greatest rating of importance. In addition, the supervisor may also easily identify the pieces of content (or groups of pieces of content) within each activity that have the greatest rating of importance.

In one embodiment, the activity termination module 446 may terminate or disable a particular activity if the overall rating of the activity satisfies a particular threshold. For example, a user may be engaged in an instant messaging session as the first activity 448. If the rating for the first activity 448 satisfies a particular threshold, the instant messaging session may be disabled or blocked from being accessed by the user in order to prevent the user from continuing to engage in the first activity 448.

Figure 5:
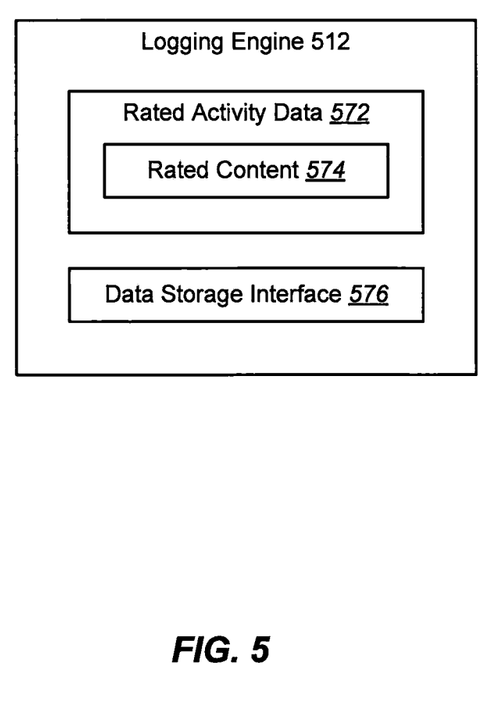
FIG. 5 is a block diagram illustrating one embodiment of a logging engine.

FIG. 5 is a block diagram illustrating one embodiment of a logging engine 512. The logging engine 512 may receive rated activity data 572. The data 572 may represent a rating assigned to a particular activity by the rating engine 110. The rated activity data 572 may include rated content 574 that represents the rating(s) of each piece of content associated with the activity. The logging engine 512 may include a data storage interface 576 that may be used to send the rated activity data 572 and the rated content 574 to a storage location. Examples of the storage location may be the cloud, a disk, an email, etc. As a result, the storage location may store the rating for each activity a user engaged in as well as a rating for each piece of content associated with an activity. The storage location may also store a copy of the actual content accessed by the user.

Figure 6:
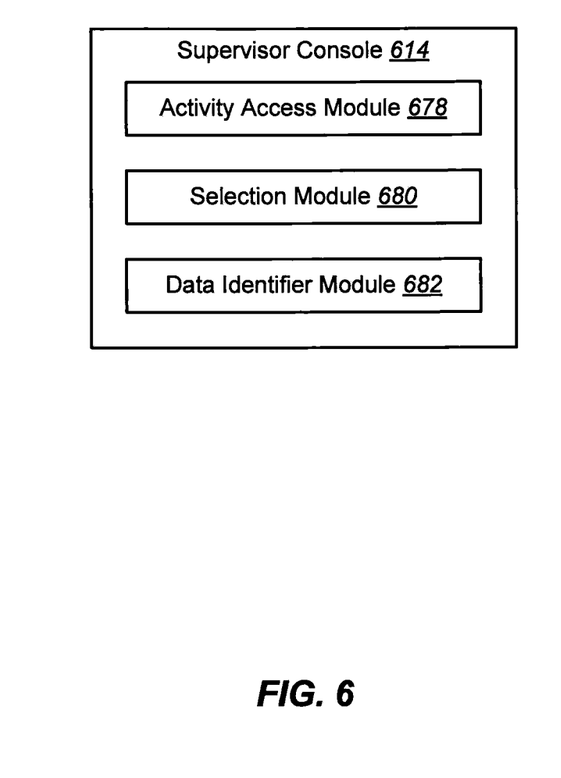
FIG. 6 is a block diagram illustrating one embodiment of a supervisor console.

FIG. 6 is a block diagram illustrating one embodiment of a supervisor console 614. As previously explained, the supervisor console 614 may be in interface for a supervisor of a user of the client device 102. The supervisor may be a parent, teacher, guardian, etc. of the user. The supervisor may desire to know the activities engaged in and the data accessed by the user on the client device 102.

In one embodiment, supervisor console 614 may include an activity access module 678. The activity access module 678 may be used to access the ratings of the activities engaged in by the user. The access module 678 may also access the ratings of each piece of content associated with the activities. In addition, the access module 678 may access the actual pieces of rated content. In one embodiment, the access module 678 accesses this information from the storage location where this information was previously stored by the logging engine 512.

A selection module 680 may select and retrieve the ratings for the desired activities, the ratings for the pieces of content associated with the activities, and the actual pieces of rated content. The selection module 680 may retrieve this information via the activity access module 678.

In one embodiment, a data identifier module 682 may identify, highlight, or otherwise mark particular activities and particular pieces of content associated with those activities based on the retrieved ratings. For example, the data identifier module 682 may identify a particular instant messaging activity engaged in by the user. The module 682 may also identify the pieces of content that have received a greater rating of importance by the rating engine 110. As a result, a supervisor may be able to easily identify the activities engaged in by the user that receive the greatest rating of importance. The supervisor may also easily identify the pieces of content from that activity that have the greatest rating of importance. Thus, the need for the supervisor to parse through possibly numerous activities and possibly thousands of pieces of content to develop a better understanding of the overall activities engaged in by the user on the client device 102 is eliminated. In one embodiment, the supervisor console 614 may be accessed by the supervisor on the client device 102, a mobile device (e.g., a cell phone, a smartphone, a PDA, etc.), a laptop, or any other type of computing device.

Figure 7:
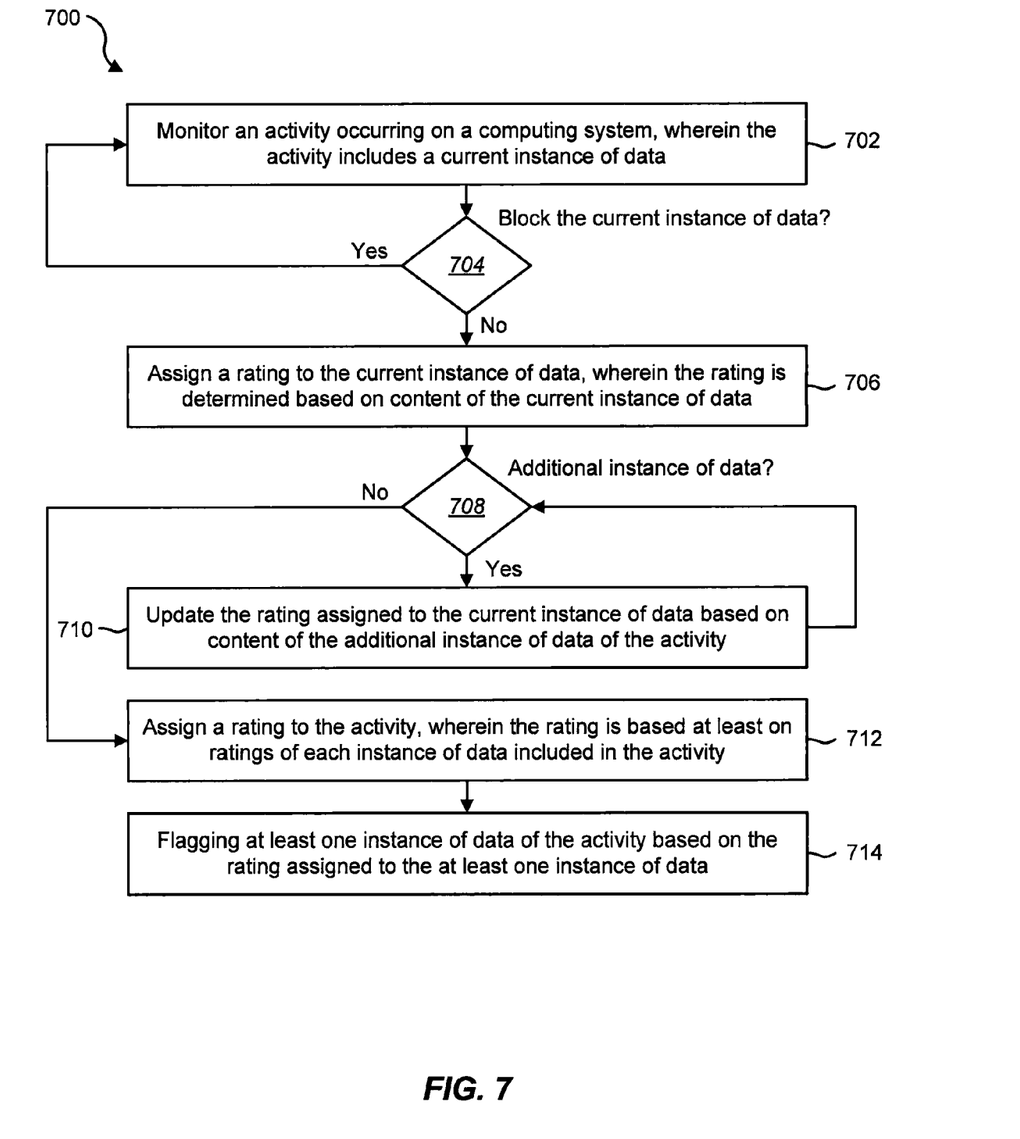
FIG. 7 is a flow diagram illustrating one embodiment of a method for rating a current instance of data based on past and future instances of data.

FIG. 7 is a flow diagram illustrating one embodiment of a method 700 for rating a current instance of data based on past and future instances of data. The method 700 may be implemented by the monitoring module 104.

In one embodiment, an activity occurring on a computing system may be monitored 702. The activity may include at least a current instance of data. A determination may be made as to whether the current instance of data should be blocked. The determination 704 may be made by accessing a particular policy associated with the user engaged in the activity. If the current instance of data is blocked, the method 700 may continue to monitor the activity for another instance of data. If, however, it is determined 704 that the current instance of data is not blocked, a rating of importance may be assigned 706 to the current instance of data. The rating may be determined based on various heuristics that determine the rating depending on the content of the current instance of data.

In one example, a determination 708 may be made as to whether additional instances of data exist for the activity. If it is determined 708 that an additional instance of data does exist for the activity, the content of the additional instance of data may be analyzed. The additional instance of data may also be assigned a rating. In one embodiment, the rating assigned to the current instance of data may be updated 710. The updated rating may be based on the content of the additional instance of data of the activity. In one configuration, the additional instance of data may occur before or after the current instance of data.

If, however, it is determined 708 that there are no additional instances of data for the activity, a rating may be assigned 712 to the activity. The rating for the activity may be based at least on the ratings of each instance of data included in the activity. In addition, at least one instance of data of the activity may be flagged 714 or otherwise identified based on the rating assigned to the at least one instance of data. For example, if an instance of data (or a group of instances of data) includes a higher rating than other instances of data (or other groups of instances of data), that instance of data (or group of instances of data) may be flagged or highlighted in a particular fashion to alert a user, such as a supervisor.

Figure 8:
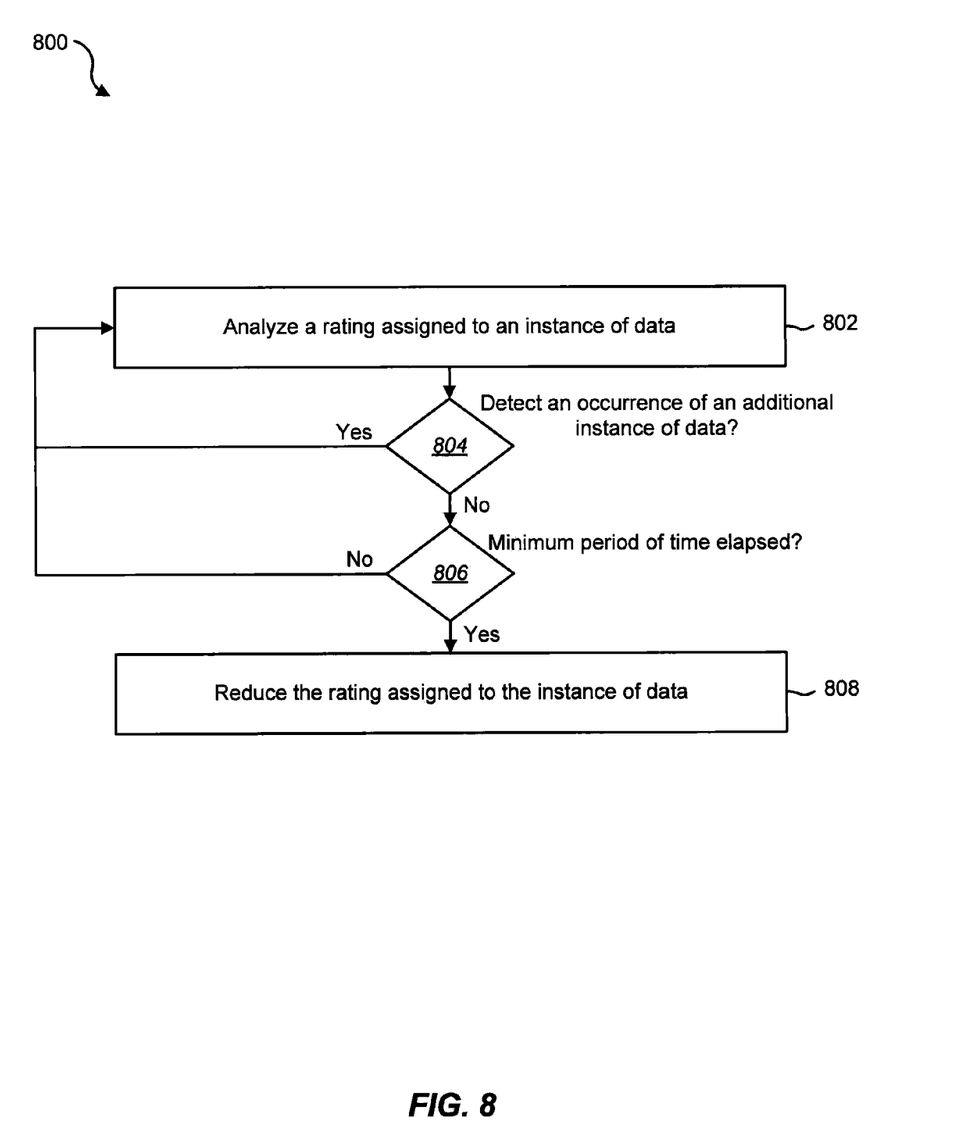
FIG. 8 is a flow chart illustrating one embodiment of a method for reducing (or decaying) the rating of a particular piece of data.

FIG. 8 is a flow chart illustrating one embodiment of a method 800 for reducing (or decaying) the rating of a particular piece of data. In one embodiment, the method 800 may be implemented by the monitoring module 104.

In one example, a rating assigned to an current instance of data may be analyzed 802. The current instance of data may be associated with a particular activity. A determination 804 may be made as to whether an additional instance of data associated with the activity is detected. For example, the determination 804 may be as to whether a stream of additional instances of data is detected. If it is determined 804 that an occurrence of an additional instance of data is detected, the method 800 may return to analyze the rating assigned to the current instance of data. In one example, the rating of the current instance of data may be updated based on an analysis of the detected additional instance of data, as previously described.

If, however, it is determined 804 that an occurrence of an additional instance of data is not detected, a second determination 806 may be made as to whether a minimum period of time has elapsed. If a minimum period of time has not elapsed, the method 800 may return to continue analyzing the rating associated with the current instance of data. If, however, it is determined 806 that the minimum period of time has elapsed, the rating assigned to the current instance of data may be reduced 808. As a result, a rating of importance assigned to the current instance of data may decay over time if no additional instances of data associated are detected.

Figure 9:
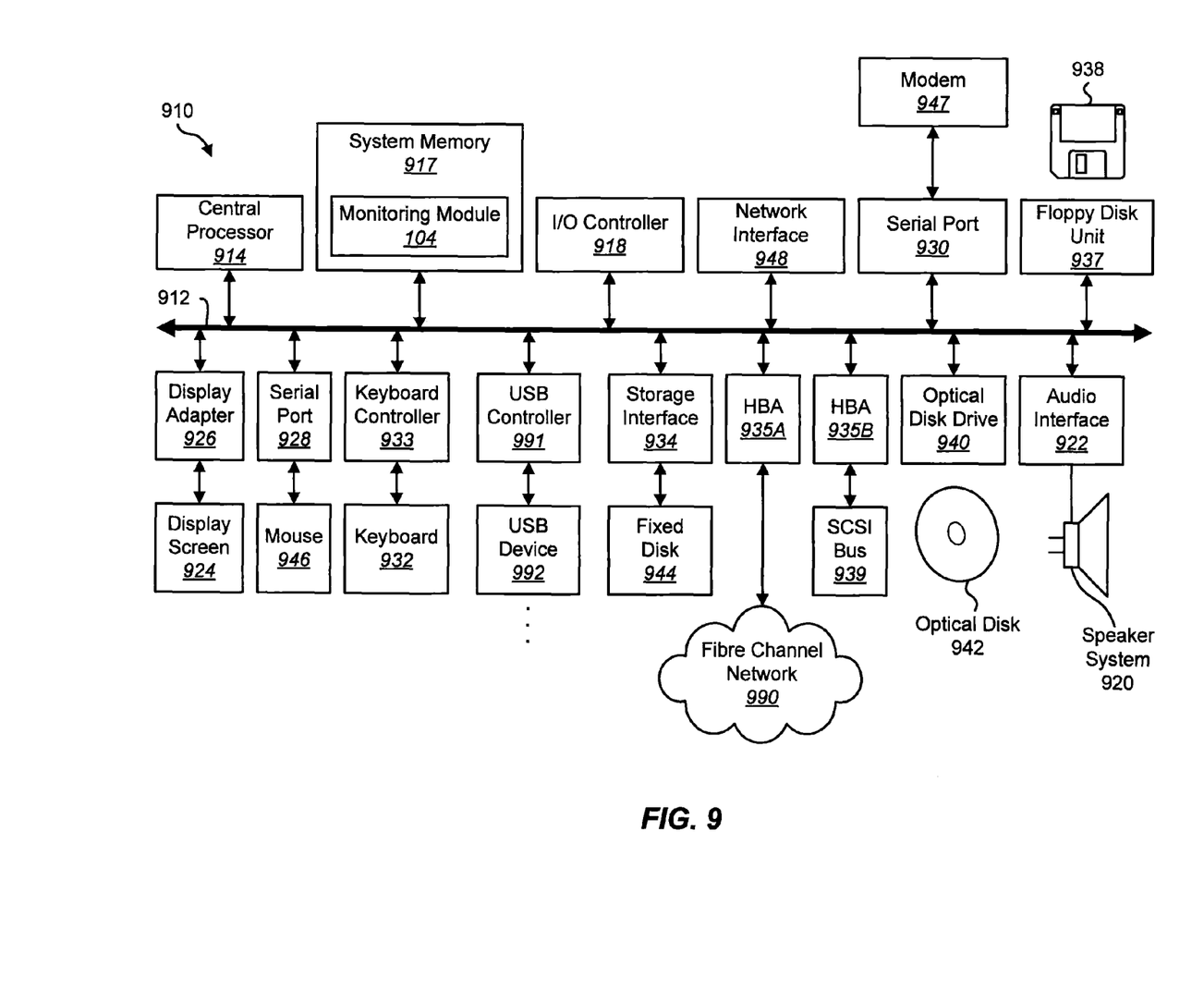
FIG. 9 depicts a block diagram of a computer system suitable for implementing the present systems and methods.

FIG. 9 depicts a block diagram of a computer system 910 suitable for implementing the present systems and methods. Computer system 910 includes a bus 912 which interconnects major subsystems of computer system 910, such as a central processor 914, a system memory 917 (typically RAM, but which may also include ROM, flash RAM, or the like), an input/output controller 918, an external audio device, such as a speaker system 920 via an audio output interface 922, an external device, such as a display screen 924 via display adapter 926, serial ports 928 and 930, a keyboard 932 (interfaced with a keyboard controller 933), multiple USB devices 992 (interfaced with a USB controller 990), a storage interface 934, a floppy disk drive 937 operative to receive a floppy disk 938, a host bus adapter (HBA) interface card 935A operative to connect with a Fibre Channel network 990, a host bus adapter (HBA) interface card 935B operative to connect to a SCSI bus 939, and an optical disk drive 940 operative to receive an optical disk 942. Also included are a mouse 946 (or other point-and-click device, coupled to bus 912 via serial port 928), a modem 947 (coupled to bus 912 via serial port 930), and a network interface 948 (coupled directly to bus 912).

Bus 912 allows data communication between central processor 914 and system memory 917, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the monitoring module 104 to implement the present systems and methods may be stored within the system memory 917. Applications resident with computer system 910 are generally stored on and accessed via a computer readable medium, such as a hard disk drive (e.g., fixed disk 944), an optical drive (e.g., optical drive 940), a floppy disk unit 937, or other storage medium. Additionally, applications can be in the form of electronic signals modulated in accordance with the application and data communication technology when accessed via network modem 947 or interface 948.

Storage interface 934, as with the other storage interfaces of computer system 910, can connect to a standard computer readable medium for storage and/or retrieval of information, such as a fixed disk drive 944. Fixed disk drive 944 may be a part of computer system 910 or may be separate and accessed through other interface systems. Modem 947 may provide a direct connection to a remote server via a telephone link or to the Internet via an internet service provider (ISP). Network interface 948 may provide a direct connection to a remote server via a direct network link to the Internet via a POP (point of presence). Network interface 948 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 9 need not be present to practice the present systems and methods. The devices and subsystems can be interconnected in different ways from that shown in FIG. 9. The operation of a computer system such as that shown in FIG. 9 is readily known in the art and is not discussed in detail in this application. Code to implement the present disclosure can be stored in computer-readable medium such as one or more of system memory 917, fixed disk 944, optical disk 942, or floppy disk 938. The operating system provided on computer system 910 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 10:
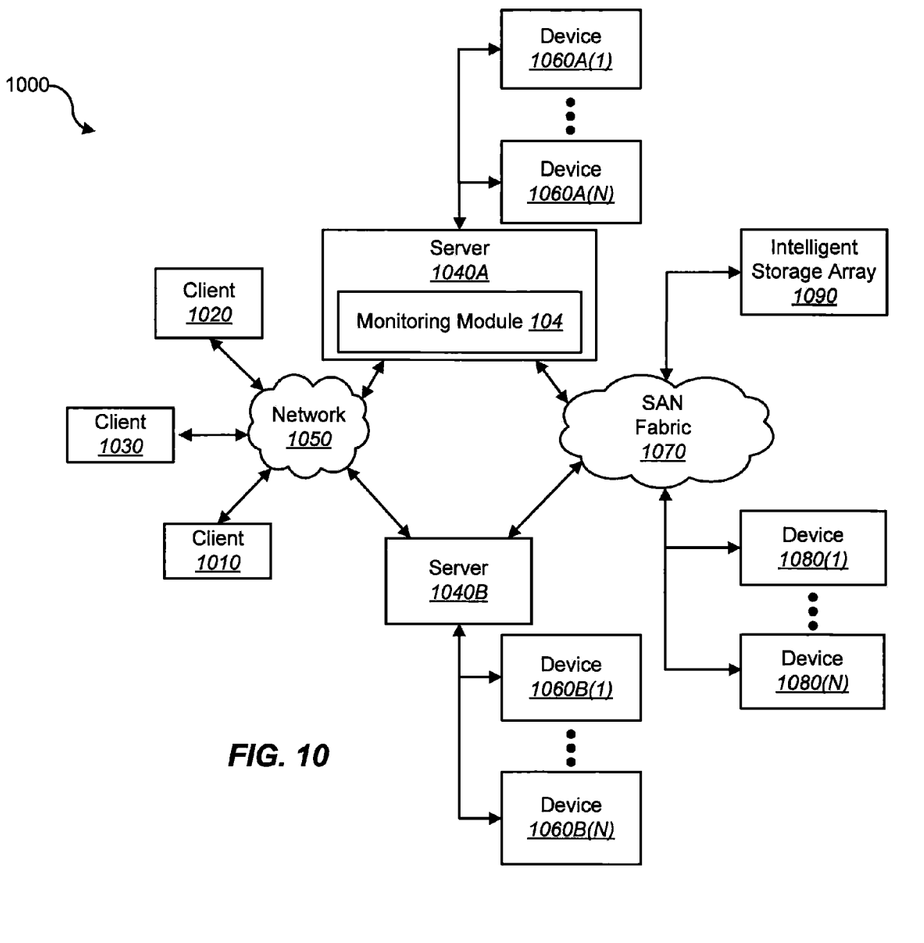
FIG. 10 is a block diagram depicting a network architecture in which client systems, as well as storage servers (any of which can be implemented using computer system), are coupled to a network.

FIG. 10 is a block diagram depicting a network architecture 1000 in which client systems 1010, 1020 and 1030, as well as storage servers 1040A and 1040B (any of which can be implemented using computer system 1010), are coupled to a network 1050. In one embodiment, the monitoring module 104 may be located within a server 1040A, 1040B to implement the present systems and methods. The storage server 1040A is further depicted as having storage devices 1060A(1)-(N) directly attached, and storage server 1040B is depicted with storage devices 1060B(1)-(N) directly attached. SAN fabric 1070 supports access to storage devices 1080(1)-(N) by storage servers 1040A and 1040B, and so by client systems 1010, 1020 and 1030 via network 1050. Intelligent storage array 1090 is also shown as an example of a specific storage device accessible via SAN fabric 1070.

With reference to computer system 910, modem 947, network interface 948 or some other method can be used to provide connectivity from each of client computer systems 1010, 1020, and 1030 to network 1050. Client systems 1010, 1020, and 1030 are able to access information on storage server 1040A or 1040B using, for example, a web browser or other client software (not shown). Such a client allows client systems 1010, 1020, and 1030 to access data hosted by storage server 1040A or 1040B or one of storage devices 1060A(1)-(N), 1060B(1)-(N), 1080(1)-(N) or intelligent storage array 1090. FIG. 10 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for rating an instant messaging activity, comprising:
    monitoring, by a hardware processor, the instant messaging activity occurring on a computing system, wherein the instant messaging activity includes a current instance of conversation data;
    assigning, by the hardware processor, a current rating to the current instance of conversation data, the current rating based on the content of the current instance of conversation data;
    detecting, by the hardware processor, a first additional instance of conversation data that is part of the instant messaging activity, the first additional instance of conversation data occurring prior to the current instance of conversation data;
    detecting, by the hardware processor, a second additional instance of conversation data that is part of the instant messaging activity, the second additional instance of conversation data occurring subsequent to the occurrence of the current instance of conversation data;
    upon detecting the first and second additional instances of conversation data, updating, by the hardware processor, the current rating assigned to the current instance of conversation data, wherein the current rating is updated based on the content of the first and second additional instance of conversation data; and
    assigning, by the hardware processor, a rating to the instant messaging activity, the rating being based on the rating assigned to the current instance of conversation data and a rating assigned to the additional instances of data.

2. The method of claim 1, further comprising determining whether access to the current instance of conversation data is to be blocked.

3. The method of claim 2, wherein the determination to block access to the current instance of conversation data is based on the content of the current instance of conversation data.

4. The method of claim 1, further comprising identifying at least one instance of conversation data based on the rating assigned to the current instance of conversation data.

5. The method of claim 4, wherein the at least instance of conversation data is identified by highlighting the content of the current instance of conversation data.

6. The method of claim 4, further comprising displaying the contents of the identified at least one instance of conversation data on a display of the computing system.

7. A computing device configured to rate an instant messaging activity, comprising:
    a processor;
    memory in electronic communication with the processor;
    instructions stored in the memory, the instructions being executable by the processor to:
        monitor the instant messaging activity occurring on a computing system, wherein the instant messaging activity includes a current instance of conversation data;
        assign a current rating to the current instance of conversation data, the current rating based on the content of the current instance of conversation data;
        detect a first additional instance of conversation data that is part of the instant messaging activity, the first additional instance of conversation data occurring prior to the current instance of conversation data;
        detect a second additional instance of conversation data that is part of the instant messaging activity, the second additional instance of conversation data occurring subsequent to the occurrence of the current instance of conversation data;
        upon detecting the first and second additional instances of conversation data, update the current rating assigned to the current instance of conversation data, wherein the current rating is updated based on the content of the first and second additional instance of conversation data; and assign a rating to the instant messaging activity, the rating being based on the rating assigned to the current instance of conversation data and a rating assigned to the additional instances of data.

8. The computing device of claim 7, wherein the instructions are further executable to determine whether access to the current instance of conversation data is to be blocked.

9. The computing device of claim 8, wherein the determination to block access to the current instance of conversation data is based on the content of the current instance of conversation data.

10. The computing device of claim 7, wherein the instructions are further executable to identify at least one instance of conversation data based on the rating assigned to the current instance of conversation data.

11. The computing device of claim 10, wherein the at least instance of conversation data is identified by highlighting the content of the current instance of conversation data.

12. The computing device of claim 10, wherein the instructions are further executable to display the contents of the identified at least one instance of conversation data on a display of the computing device.

13. A computer-program product for rating an instant messaging activity, the computer-program product comprising a non-transitory computer-readable medium having instructions thereon, the instructions being executable by a processor to:

monitor the instant messaging activity occurring on a computing system, wherein the instant messaging activity includes a current instance of conversation data;

assign a current rating to the current instance of conversation data, the current rating based on the content of the current instance of conversation data;

detect a first additional instance of conversation data that is part of the instant messaging activity, the first additional instance of conversation data occurring prior to the current instance of conversation data;

detect a second additional instance of conversation data that is part of the instant messaging activity, the second additional instance of conversation data occurring subsequent to the occurrence of the current instance of conversation data;

upon detecting the first and second additional instances of conversation data, update the current rating assigned to the current instance of conversation data, wherein the current rating is updated based on the content of the first and second additional instance of conversation data; and assign a rating to the instant messaging activity, the rating being based on the rating assigned to the current instance of conversation data and a rating assigned to the additional instances of data.

* * * * *